United States Patent
Hara et al.

(10) Patent No.: US 7,633,902 B2
(45) Date of Patent: Dec. 15, 2009

(54) INFORMATION COMMUNICATION PROGRAM, INFORMATION COMMUNICATION APPARATUS AND INFORMATION COMMUNICATION METHOD

(75) Inventors: Masahiro Hara, Kawasaki (JP); Nobutsugu Fujino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 357 days.

(21) Appl. No.: 11/374,110

(22) Filed: Mar. 14, 2006

(65) Prior Publication Data

US 2007/0109998 A1    May 17, 2007

(30) Foreign Application Priority Data

Nov. 17, 2005   (JP)   ............. 2005-332349

(51) Int. Cl.
*G06F 15/16*   (2006.01)
(52) U.S. Cl. ...................... 370/331; 370/389
(58) Field of Classification Search ............. 370/331, 370/389, 392, 400, 401, 466, 467
See application file for complete search history.

(56) References Cited

U.S. PATENT DOCUMENTS

2002/0067731 A1 *  6/2002  Houston et al. ............. 370/401
2005/0007995 A1     1/2005  Inoue et al.

FOREIGN PATENT DOCUMENTS

| JP | 2002-118596   | 4/2002  |
| JP | 2003-060683 A | 2/2003  |
| JP | 2003-087173 A | 3/2003  |
| JP | 2005-033374 A | 2/2005  |
| JP | 2005-318060 A | 11/2005 |

OTHER PUBLICATIONS

"Japanese Office Action", Complete English-language translation, mailed Feb. 17, 2009 from Japanese Patent Office for corresponding JP App. No. 2005-332349.

* cited by examiner

*Primary Examiner*—Sam Bhattacharya
(74) *Attorney, Agent, or Firm*—Fujitsu Patent Center

(57) ABSTRACT

An information communication program, an information communication apparatus and an information communication method make it possible for a mobile node to maintain direct communication with some other terminal while it is moving from a network to another if the some other terminal is always located on a particular network. An information communication program for causing a computer to execute an operation of controlling an information communication apparatus having a static address and a dynamic address comprises a receiving party's address determining step that determines the address of the party receiving the packets delivered from an application of the information communication apparatus according to the address information of the packets to be transmitted and the address information of a predetermined subnet in order to transmit them to the receiving party and an encapsulating step that encapsulates the packets to be transmitted so as to transmit them by way of the relay apparatus when the receiving party's address is the first subnet.

26 Claims, 13 Drawing Sheets

| NETWORK ADDRESS | HOME AGENT ADDRESS | INTERFACE |
|---|---|---|
| LCN | NONE | ORIGINAL INTERFACE |
| RCN | HA | MOBILE IP VIRTUAL INTERFACE |

FIG.7

| NETWORK ADDRESS | HOME AGENT ADDRESS | INTERFACE |
|---|---|---|
| SUBNET 71a | NONE | ORIGINAL INTERFACE |
| SUBNET 71b | NONE | ORIGINAL INTERFACE |
| SUBNET 71c | NONE | ORIGINAL INTERFACE |

FIG.9

| NETWORK ADDRESS | HOME AGENT ADDRESS | INTERFACE |
|---|---|---|
| LOCAL NETWORK 41a | NONE | ORIGINAL INTERFACE A |
| LOCAL NETWORK 41b | NONE | ORIGINAL INTERFACE B |

FIG.11

| NETWORK ADDRESS | HOME AGENT ADDRESS | INTERFACE |
|---|---|---|
| REMOTE NETWORK 44a | HAA | MOBILE IP VIRTUAL INTERFACE A |
| REMOTE NETWORK 44b | HAB | MOBILE IP VIRTUAL INTERFACE B |

FIG.13

| Type=3 (*1) | Code | Lifetime |
|---|---|---|
| Home Agent |||
| Home Address |||
| Identification |||
| Type=Ext | Reserved | Length |
| Remote Network Address (SN72a) |||
| Remote Network Mask (SN72a) |||
| Remote Network Address (SN72c) |||
| Remote Network Mask (SN72c) |||
| Remote Network Address (SN72d) |||
| Remote Network Mask (SN72d) |||

(*1) Type=3 → Registration Reply
(*2) TYPE = EXT → TYPE EXPANDED FOR THE PRESENT INVENTION

FIG.14

| NETWORK ADDRESS | HOME AGENT ADDRESS | INTERFACE |
|---|---|---|
| SUBNET SN72a | HAA | MOBILE IP VIRTUAL INTERFACE |
| SUBNET SN72c | HAA | MOBILE IP VIRTUAL INTERFACE |
| SUBNET SN72d | HAA | MOBILE IP VIRTUAL INTERFACE |

FIG.19

| LOCAL NETWORK SIDE | | REMOTE NETWORK SIDE | |
|---|---|---|---|
| IP ADDRESS | PORT NUMBER | IP ADDRESS | PORT NUMBER |
| LCN-ADDR | LCN-PORT | Home Address | ANY-PORT |
| ... | ... | ... | ... |

INFORMATION COMMUNICATION PROGRAM, INFORMATION COMMUNICATION APPARATUS AND INFORMATION COMMUNICATION METHOD

BACKGROUND OF THE INVENTION

1. Field of the Invention

This invention relates to an information communication program, an information communication apparatus and an information communication method for communication adapted to use discriminately the address assigned by the connected network and a specific address.

2. Description of the Related Art

The Mobile IP (Internet Protocol) is being used as technique for transferring packets to the destination terminal when the packets are transmitted to the address of the destination terminal but the destination terminal is moving from a network to another. Normally, a terminal that uses the Mobile IP (to be referred to as mobile node hereinafter) has a home address that is an inherent IP address. When the mobile node is located on the home network where it is supposed to be normally found, the packets addressed to the mobile node arrive at the mobile node that is located at the home address.

However, when the mobile node moves to a foreign network that is different from the home network, a care-of address that is an effective IP address on the foreign network is assigned to the mobile node and the corresponding relationship between the home address and the care-of address is registered in the home agent of the home network. With this arrangement, when packets are transmitted to the home address of the mobile node and if it is confirmed that the mobile node that is the addressee of the packets is not located on the home network, the home agent transfers the packets to the addressee mobile node that is found on the foreign network.

The mobile node has the home address as its own IP address and it is normally assumed that some other terminal that transmits data to the mobile node sends out the packets of the data to the home address of the mobile node.

Besides, in addition to the interface by way of which the mobile node communicates (to be referred to as original interface hereinafter), the mobile node has a Mobile IP virtual interface as network interface for the purpose of generating encapsulated packets for the Mobile IP and canceling the encapsulation of the packets.

The prior art that relates to the present invention includes Patent Document 1 [Jpn. Pat. Appln. Laid-Open Publication No. 2002-118596, which proposes an address assigning method for packets in a mobile communication system of the third generation. With the proposed method, when a mobile node is found on a foreign network, the home agent changes the header of the packets to be transmitted to the mobile node and the foreign agent of the foreign network or the mobile node puts the care-of address to the arrived packets. With this arrangement, it is possible to prevent the packets from being refused by the firewall of the network.

However, it is assumed that the packets that are to be received by mobile node are addressed to the home address of the mobile node by way of the Mobile IP virtual interface. This means that, if packets are transmitted to the mobile node from some other terminal on the foreign network, they are transmitted as packets addressed to the home address and the home agent encapsulates and transfers them to the care-of address of the mobile node. In other words, the packets pass through the Mobile IP virtual interface without fail and there exist no packets that are assumed to pass through only the original interface.

When a mobile node is located on a foreign network and some other terminal on the foreign network transmits packets to the mobile node, the terminal transmits the packets to the home address of the mobile node. In other words, the mobile node receives the packets that are encapsulated by way of the home agent. This is because the mobile node is identified only by means of its home address.

In networks where the Mobile IP is installed, the packets to be received by a mobile node are processed by way of the Mobile IP virtual interface of the mobile node without fail. If some other terminal on a foreign network where the mobile node is currently located transmits packets to the care-of address of the mobile node, the Mobile IP virtual interface of the mobile node tries to decapsulate of the received packets to give rise to a problem of discarding packets and/or doing undefined operations.

When the mobile node receives the packets at its own care-of address and then it tries to transmit packets to some other terminal on the foreign network where the mobile node is currently located, the source address of the transmitted packets is that of the home agent so that there arises a problem of disagreement between the address to which the some other terminal transmits packets, which is the care-of address of the mobile node, and the address at which the mobile node receives the packets, which is the home address of the mobile node.

When, on the other hand, the mobile node that is currently located on a foreign network transmits packets to some other terminal on the same foreign network, the packets are transmitted through the Mobile IP virtual interface, encapsulated and then transferred to the some other terminal by way of the home agent. In other words, it is not possible to directly transmit the some other terminal only by way of the original interface.

As described above, it is not possible for an existing mobile node to maintain direct communication with some other terminal while it is moving from a network to another if the some other terminal is always located on a particular network.

SUMMARY OF THE INVENTION

In view of the above identified problem, it is therefore an object of the present invention to provide an information communication program, an information communication apparatus and an information communication method that make it possible for a mobile node to maintain direct communication with some other terminal while it is moving from a network to another if the some other terminal is always located on a particular network.

In an aspect of the present invention, the above object is achieved by providing an information communication program for causing a computer to execute an operation of controlling an information communication apparatus having a static address registered in an external first relay apparatus in advance assigned to it and a dynamic address assigned to it on a subnet connected to it, the program comprising: a receiving party's address determining step that determines the address of the party receiving the packets delivered from an application of the information communication apparatus according to address information of the packets to be transmitted and address information of a predetermined first subnet in order to transmit them to the receiving party, and an encapsulating step that encapsulates the packets to be transmitted so as to transmit them by way of the first relay apparatus when the receiving party's address is the first subnet.

Preferably, an information communication program according to the invention further comprises: a transmitting party's address determining step that determines the address of the party that transmitted the packets when the packets to be received arrive from a network according to address information of the packets to be received and address information of the first relay apparatus acquired in advance, and an encapsulation canceling step that cancels the encapsulation of the packets to be received that are encapsulated by the first relay apparatus when the address of the transmitting party is determined to be that of the first relay apparatus by the transmitting party's address determining step.

Preferably, in an information communication program according to the invention, the receiving party's address determining step determines the address of the party receiving the packets to be transmitted according to address information of the packets to be transmitted, address information of the first subnet acquired in advance and address information of a predetermined second subnet that is acquired in advance, and further comprises a transmitting step that transmits the encapsulated packets when the packets to be transmitted are encapsulated by the encapsulating step but transmits the packets to be transmitted without encapsulation when the transmitting party's address is determined to be the second subnet by the transmitting party's address determining step.

Preferably, in an information communication program according to the invention, the transmitting party's address determining step determines the address of the party transmitting the packets to be received according to address information of the packets to be received, address information of the first relay apparatus acquired in advance and address information of a predetermined second subnet acquired in advance and, further comprises a receiving step that, when the encapsulation of the packets to be received is cancelled by the encapsulation canceling step, delivers the packets to be received, for which the encapsulation is canceled, to the application of the information communication apparatus but, when the transmitting party's address is determined to be the second subnet by the transmitting party's address determining step, delivers the packets to be received alone to the application of the information communication apparatus, while processes the packets to be received as unauthorized packets when the transmitting party's address determining step determines that the transmitting party's address is neither the address of the first relay apparatus nor that of the second subnet.

Preferably, an information communication program according to the invention further comprises: a connected subnet's address information acquiring step that computationally determines the range of addresses of a subnet according to the dynamic address and the address mask that are assigned when the information communication apparatus is connected to the subnet and provides the range of addresses as address information of the second subnet.

Preferably, an information communication program according to the invention further comprises: a neighboring subnet address information acquiring step that transmits a multicast message, for which the number of hops is limited, to the network, receives a response message responding to the multicast message, acquires subnet information from the response message and provides the subnet information as address information of the second subnet.

Preferably, in an information communication program according to the invention, the information communication apparatus is connected to a plurality of subnets and a dynamic address is assigned to it from each of the plurality of subnets, while the receiving party's address determining step acquires address information of the plurality of subnets as address information of the second subnet, and the transmitting step is executed for each of the dynamic addresses.

Preferably, in an information communication program according to the invention, different static addresses are assigned to the information communication apparatus in advance from the plurality of first relay apparatus, and the transmitting party's address determining step acquires address information of the plurality of first relay apparatus, while the encapsulating step is executed for each of the static addresses.

Preferably, an information communication program according to the invention further comprises: a relay subnet address information acquiring step that transmits a registration request message for assignment of a static address to the first relay apparatus, receives a response message responding to the registration request message from the first relay apparatus and acquires address information on the address of the first relay apparatus, the static address and the address of the first subnet, the first relay apparatus being adapted to transmit a response message including information on the address of the first relay apparatus, the static address and the address of the first subnet in response to the registration request message transmitted from the information communication apparatus.

Preferably, an information communication program according to the invention further comprises: a corresponding relationship registering step that transmits the corresponding relationship between the static address and the first dynamic address assigned by a first connection subnet to the first relay apparatus when the information communication apparatus is connected to the first connection subnet that is a subnet, and a corresponding relationship reregistering step that transmits the corresponding relationship between the static address and the second dynamic address assigned by a second connection subnet to the first relay apparatus when the information communication apparatus is connected to the second connection subnet that is a subnet different from the first connection subnet, a second relay apparatus, which is a relay apparatus existing in the first connection subnet, being adapted to acquire the corresponding relationship between the static address and the first dynamic address transmitted by the corresponding relationship registering step and, when communication is conducted between the information communication apparatus connected to the second connection subnet and a terminal connected to the first connection subnet by way of the first relay apparatus, execute an address conversion of the static address and the first dynamic address between the first relay apparatus and the terminal connected to the first connection subnet.

Preferably, in an information communication program according to the invention, the second relay apparatus manages an effective period of the corresponding relationship; between the static address and the first dynamic address.

Preferably, an information communication program according to the invention further comprises: an address converting step that executes an address conversion between the first terminal connected to the first subnet and a second terminal connected to the second subnet.

Preferably, in an information communication program according to the invention, the receiving party's address of the packets is the static address of the information communication apparatus and the address converting step converts the address of the party receiving the packets to the address of the second terminal when the first terminal transmits the packets to the second terminal, whereas the receiving party's address of the packets is the dynamic address of the information communication apparatus and the address converting step converts the address of the party receiving the packets to the address of the first terminal when the second terminal transmits the packets to the first terminal.

Preferably, in an information communication program according to the invention, the information communication apparatus is a mobile node for the Mobile IP, and the first relay apparatus is a home agent for the Mobile IP, whereas the static address is a home address for the Mobile IP, and the dynamic address is a care-of address for the Mobile IP.

In another aspect of the present invention, there is provided an information communication apparatus having a static address registered in an external first relay apparatus in advance assigned to it and a dynamic address assigned to it on a subnet connected to it, the apparatus comprising: a receiving party's address determining section that determines the address of the party receiving the packets delivered to it according to address information of the packets to be transmitted and address information of a predetermined first subnet in order to transmit them to the receiving party; and an encapsulating section that encapsulates the packets to be transmitted so as to transmit them by way of the first relay apparatus when the receiving party's address is the first subnet.

Preferably, an information communication apparatus according to the invention further comprises: a transmitting party's address determining section that determines the address of the party that transmitted the packets when the packets to be received arrive from a network according to address information of the packets to be received and address information of the first relay apparatus acquired in advance; and an encapsulation canceling section that cancels the encapsulation of the packets to be received that are encapsulated by the first relay apparatus when the address of the transmitting party is determined to be that of the first relay apparatus by the transmitting party's address determining section.

Preferably, in an information communication apparatus according to the invention, the receiving party's address determining section determines the address of the party receiving the packets to be transmitted according to address information of the packets to be transmitted, address information of the first subnet acquired in advance and address information of a predetermined second subnet that is acquired in advance and, further comprises a transmitting section that transmits the encapsulated packets when the packets to be transmitted are encapsulated by the encapsulating section but transmits the packets to be transmitted without encapsulation when the transmitting party's address is determined to be the second subnet by the transmitting party's address determining section.

Preferably, in an information communication program according to the invention, the transmitting party's address determining section determines the address of the party transmitting the packets to be received according to address information of the packets to be received, address information of the first relay apparatus acquired in advance and address information of a predetermined second subnet acquired in advance and, further comprises a receiving section that, when the encapsulation of the packets to be received is cancelled by the encapsulation canceling section, outputs the packets to be received for which the encapsulation is canceled but, when the transmitting party's address is determined to be the second subnet by the transmitting party's address determining section, outputs the packets to be received alone, while processes the packets to be received as unauthorized packets when the transmitting party's address determining section determines that the transmitting party's address is neither the address of the first relay apparatus nor that of the second subnet.

In still another aspect of the present invention, there is provided an information communication method for controlling an information communication apparatus having a static address registered in an external first relay apparatus in advance assigned to it and a dynamic address assigned to it on a subnet connected to it, the method comprising: a receiving party's address determining step that determines the address of the party receiving the packets delivered from an application of the information communication apparatus according to address information of the packets to be transmitted and address information of a predetermined first subnet in order to transmit them to the receiving party; and an encapsulating step that encapsulates the packets to be transmitted so as to transmit them by way of the first relay apparatus when the receiving party's address is the first subnet.

Preferably, an information communication method according to the invention further comprises: a transmitting party's address determining step that determines the address of the party that transmitted the packets when the packets to be received arrive from a network according to address information of the packets to be received and address information of the first relay apparatus acquired in advance and an encapsulation canceling step that cancels the encapsulation of the packets to be received that are encapsulated by the first relay apparatus when the address of the transmitting party is determined to be that of the first relay apparatus by the transmitting party's address determining step.

Thus, according to the present invention, it is possible for a mobile node to maintain direct communication with some other terminal while it is moving from a network to another if the some other terminal is always located on a particular network.

BRIEF DESCRIPTION OF THE DRAWINGS

FIG. 7 is an interface selection table that can be used for the second embodiment;

FIG. 9 is an interface selection table that can be used for the third embodiment;

FIG. 11 is an interface selection table that can be used for the fourth embodiment;

FIG. 13 is a schematic illustration of the field of registration reply [RFC3344] of the fifth embodiment;

FIG. 14 is an interface selection table that can be used for the fifth embodiment;

FIG. 19 is a port mapping table of the seventh embodiment.

DETAILED DESCRIPTION OF THE PREFERRED EMBODIMENTS

Now, preferred embodiments of the present invention will be described in greater detail by referring to the accompanying drawings.

First Embodiment

The information communication apparatus of this invention can be operated for both ordinary direct local communications with terminals of a neighboring network and remote communications by way of a home agent according to the Mobile IP. It is assumed in the following description that the information communication apparatus of this invention, which is a mobile node, is located on a network other than the network where the home agent is found.

Firstly, the software configuration of the mobile node of this embodiment will be described.

Figure 1:
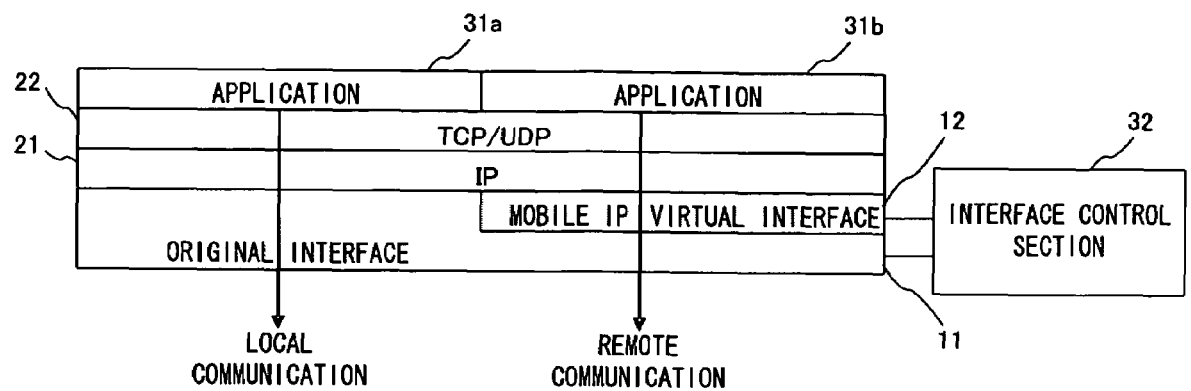
FIG. 1 is a schematic block diagram of a first embodiment of the present invention, illustrating the software configuration of a mobile node thereof.

FIG. 1 is a schematic block diagram of the mobile node of the first embodiment, illustrating the software configuration thereof. The mobile node comprises an original interface 11, a Mobile IP virtual interface 12, an IP 21, a TCP (transmission control protocol)/UDP (user datagram protocol) 22, applications 31a, 31b and an interface control section 32. The application 31a operates for local communications by way of the TCP/UDP 22, the IP 21 and the original interface 11. The application 31b operates for remote communications by way of the Mobile IP virtual interface 12 and the original interface 11.

An original interface 11 is an interface to be used for actual communications by using a wireless LAN (local area network), a W-CDMA (wideband-code division multiple access), a PHS (personal handyphone system) or the like. A Mobile IP virtual interface 12 is a virtual interface arranged at a layer above the original interface 11 so as to operate for encapsulating IP packets and canceling the encapsulation.

The interface control section 32 manages the interface selection table and selects the interface to be used. More specifically, it uses only the original interface 11 for the local network but it uses the Mobile IP virtual interface 12 and the original interface 11 for a remote network. The interface selection table has entries for each network and network addresses for identifying a network from the address field of a packet, the address of the home agent and the interface to be used for the network are registered in the table.

Now, a typical communication environment of the mobile node of the first embodiment will be described below.

Figure 2:
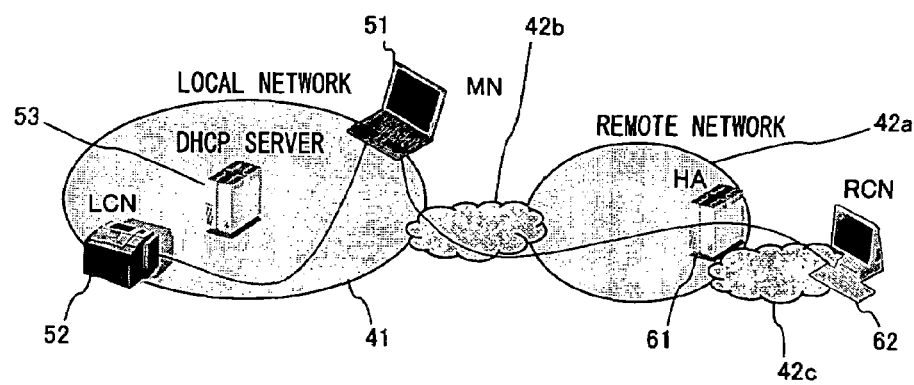
FIG. 2 is a schematic block diagram of the first embodiment, illustrating a communication environment of the mobile node of FIG. 1.

FIG. 2 is a schematic block diagram illustrating a communication environment of the mobile node of the first embodiment. The communication environment has a local network 41 and remote networks 42a, 42b, 42c. The local network 41 is connected to the remote network 42b and the remote network 42b is connected to the remote network 42a, which remote network 42a is by turn connected to the remote network 42c. A mobile node (MN) 51, that is a communication transmission/reception apparatus according to the present invention, a terminal (LCN) 52 that is operated for local communications with the MN 51 and a DHCP (dynamic host configuration protocol) server 53 are connected to the local network 41. A home agent (HA) 61 is connected to the remote network 42a. A terminal (RCN) 62 that is operated for remote communications with the MN 51 is connected to the remote network 42c.

The network to be used by the MN 51 for local communications is referred to as local network and each of the networks to be used by the MN 51 for remote communications is referred to as remote network hereinafter.

Now, the interface selection table will be described below.

Figures 3, 4:
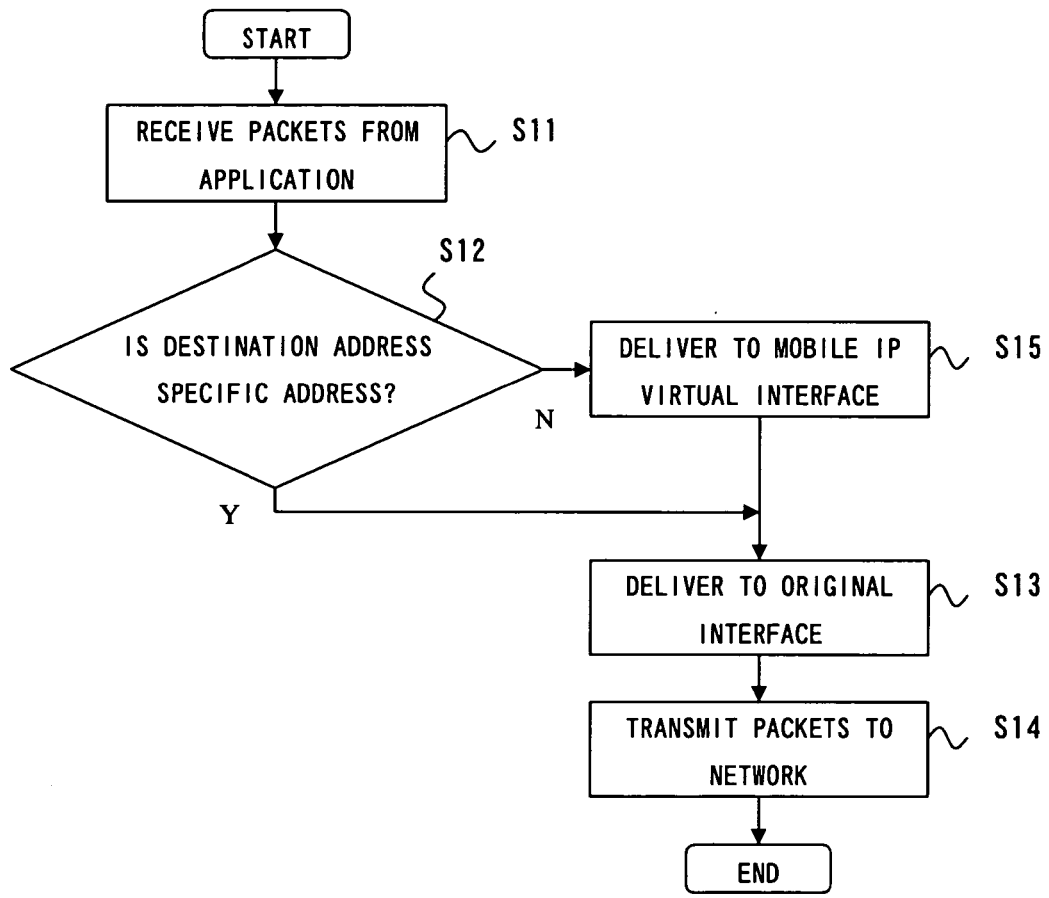
FIG. 3 is an interface selection table that can be used for the first embodiment.
FIG. 4 is a flowchart of the transmission operation of the mobile node of the first embodiment.

FIG. 3 is an interface selection table that can be used for the first embodiment. Referring to FIG. 3, the network address, the address of the home agent and the type of the interface are registered as entries for each range of addresses to be used. In the illustrated instance, the entries of LCN 52 for local communications and entries of RCN 62 for remote communications are registered. The registered entries of the LCN 52 include the address of the LCN 52, which is a network address, and the original interface, which is an interface, but no address of a home agent is registered there. The registered entries of the RCN 62 include the address of the RCN 62, which is a network address, the address of the home agent HA 61 and the Mobile IP virtual interface, which is an interface.

In the illustrated instance, any packet to be transmitted of which the destination address is the address of the LCN or included in the range of addresses in the column of network address of the interface selection table is determined as packet to be transmitted to the local network 41 so that it is transmitted by using only the original interface 11, whereas any packet to be transmitted of which the destination address is not included in the range of addresses of the LCN is determined as packet to be transmitted to the remote networks 42a, 42b, 42c so that it is transmitted by using the Mobile IP virtual interface 12.

Similarly, any packet to be received of which the source address is included in the range of LCN in the column of network address of the interface selection table is determined to be received from the local network 41 so that it is received by using only the original interface 11, whereas any packet to be received of which the source address agrees with the address in the column of address of the home agent in the interface selection table is determined to be received from the remote networks 42a, 42b, 42c so that it is received by using the Mobile IP virtual interface 12. If the address of the packet to be received is other than those listed above, it is thrown away as unauthorized packet.

Now, the operation of selecting a network address from the above-described interface selection table will be described below.

As the MN 51 moves to the local network 41, the DHCP server 53 in the local network 41 automatically assigns an IP address to the MN 51. The IP address is treated as care-of address (CoA) for the Mobile IP. The DHCP server 53 provides address mask information to the MN 51 in addition to the IP address. The MN 51 computationally determines the range of addresses of the LCN 52 on the local network 41 from the CoA and the address mask information and registers it for the network address of the LCN 52 in the interface selection table.

The network address of the LCN 52 in the interface selection table may be registered manually If the network is an ad hoc network, the MN 51 may automatically register the link local address as network address of the LCN 52.

Now, the operation of transmitting packets of the MN 51 will be described below.

FIG. 4 is a flowchart of the transmission operation of the mobile node of the first embodiment. Referring to FIG. 4, the interface control section 32 firstly receives the packets to be transmitted from the applications 31a, 31b by way of the TCP/UDP 22 and the IP 21 (S11) and determines if the destination address of the packets to be transmitted is a specific network address or not by referring to the address fields of the packets to be transmitted and the interface selection table (S12).

If the address of the packets to be transmitted is a specific network address (S12, Y), the interface control section 32 delivers the packets to be transmitted to the original interface 11 (S13) and the original interface 11 by turn transmits the packets to the network (Step S14) to end the flow of operation. If, on the other hand, the address of the packets to be transmitted is not a specific network (S12, N), the interface control section 32 delivers the packets to be transmitted to the Mobile IP virtual interface 12 and the Mobile IP virtual interface 12 by turn encapsulates the packets (S15) before it moves to the processing step S13.

Now, the address fields of the packets that the MN 51 receives will be described below. The packets that are transmitted to the local network 41 are transmitted to the communication partner only passing through the original interface 11. Therefore, the address fields of the packets show the information as listed below.

source address=care-of address (CoA)
destination address=IP address of the communication partner (LCN)

On the other hand, the packets that are transmitted to the remote network 42 are encapsulated by the Mobile IP virtual interface 12 and hence the address fields of the packets show IP addresses at the inside and at the outside of capsule that are different from each other. Thus, the address fields of the packets show the information as listed below.

source address at the inside of capsule=home address (HoA)
destination address at the inside of capsule=IP address of the communication partner (RCN)
source address at the outside of capsule=CoA
destination address at the outside of capsule=address of the home agent (HA)

Now, the operation of receiving packets by the MN 51 will be described below.

Figure 5:
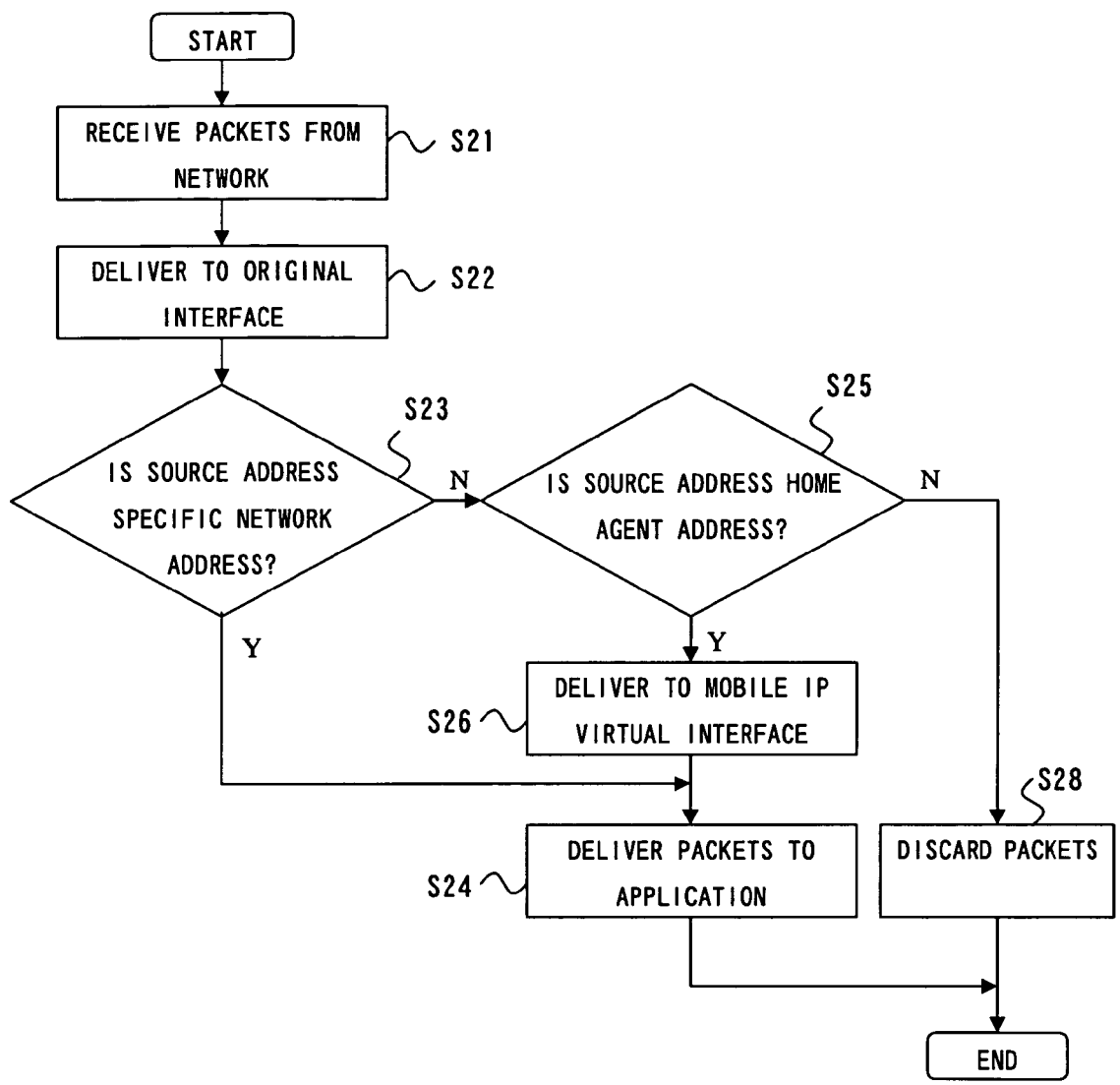
FIG. 5 is a flowchart of the reception operation of the mobile node of FIG. 1 of the first embodiment.

FIG. 5 is a flowchart of the reception operation of the mobile node of the first embodiment. Referring to FIG. 5, as the MN 51 receives packets from the network (S21), the interface control section 32 delivers them to the original interface 11 so that the original interface 11 executes a reception process (S22). Then, the interface control section 32 determines if the source address of the received packets is a specific network address or not by referring to the address fields of the received packets and the interface selection table (S23).

If the source address of the received packets is a specific network address (S23, Y), the interface control section 32 delivers the packets to the applications 31a, 31b from the original interface 11 by way of the IP 21 and the TCP/UDP 22 (S24) to end the flow of operation. If, on the other hand, the source address of the received packets is not a specific network address (S23, N), the interface control section 32 determines if the source address of the received packets is the address of the home agent or not by referring to the address fields of the received packets and the interface selection table (S25).

If the source address of the received packets is the address of the home agent (S25, Y), the interface control section 32 delivers the packets processed by the original interface 11 to the Mobile IP virtual interface 12 and the Mobile IP virtual interface 12 by turn decapsulate of the packets (S26) before it moves to the processing step S24. If, on the other hand, the source A/D of the received packets is not the address of the home agent (S25, N), the interface control section 32 throws away the received packets as unauthorized packets (S28) and ends the processing operation.

As described above, when the MN 51 receives encapsulated packets from the remote networks, it cancels the encapsulation of the packets by way of the Mobile IP virtual interface 12. When, on the other hand, the MN 51 receives packets that are not encapsulated from the local network, they arrive only by way of the original interface 11. Therefore, according to the present invention, the MN 51 determines if the received packets are encapsulated or not, seeing the source address of the packets, and selects either if it uses only the original interface 11 or it receives the packets by way of the Mobile IP virtual interface 12.

Now, the address fields of the packets that the MN 51 receives will be described below. The packets that the MN 51 receives from the local network 41 are delivered to the applications only by way of the original interface 11. Therefore, the address fields of the packets show the information as listed below.

source address=LCN
destination address=CoA

On the other hand, the packets that are received from the remote network 42 are encapsulated by the Mobile IP virtual interface 12 and hence the address fields of the packets show IP addresses at the inside and at the outside of capsule that are different from each other. Thus, the address fields of the packets show the information as listed below.

source address at the inside of capsule=RCN
destination address at the inside of capsule=HoA
source address at the outside of capsule=HA
destination address at the outside of capsule=CoA The interface control section 32 throws away the packets that are neither from the local network 41 nor from the remote networks 42 as unauthorized packets.

Thus, the above described embodiment of the present invention enjoy the advantage of receiving the services it can receive regardless of the network on which it is located by communicating with the remote networks and also the services it can receive only when it is located on a specific local network by communicating with the local network. Additionally, as the mobile node automatically recognizes the type of communication that the user is trying, selects and executes the corresponding process, the user can receive the services without any particular efforts and also without using any apparatus other than the mobile node to a great convenience on the part of the user.

Additionally, the mobile node automatically recognizes the local network and selects an appropriate interface by using the DHCP and other arrangements found on the local network.

Second Embodiment

The mobile node of this embodiment recognizes the network that is found in the neighborhood of the network where it is located also as local network and expands the scope of local network.

The software configuration of the mobile node of this embodiment is similar to that of the mobile node of the first embodiment.

Now, a typical communication environment of the mobile node of the second embodiment will be described below.

Figure 6:
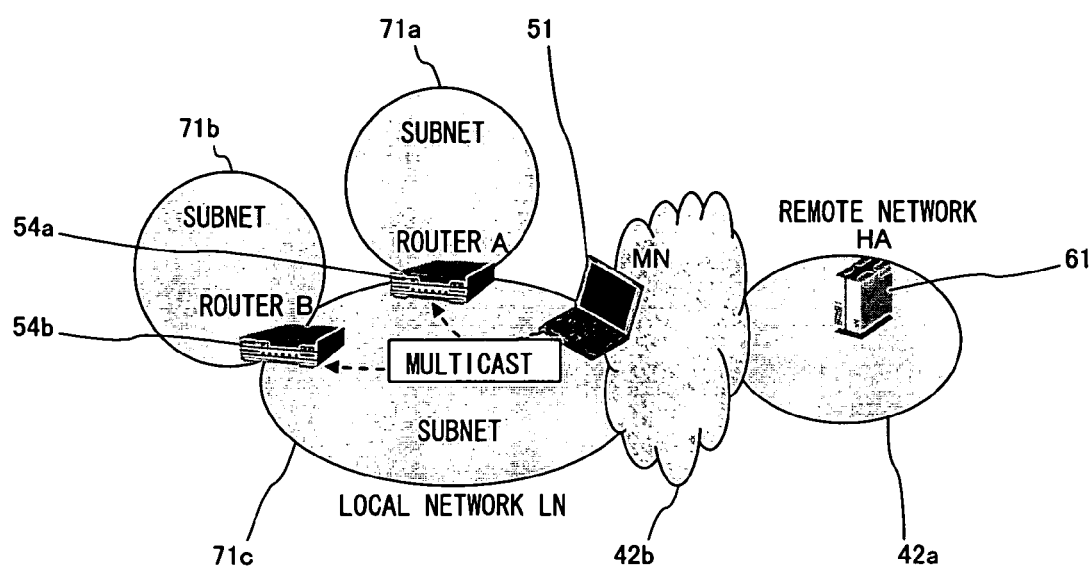
FIG. 6 is a schematic block diagram of a second embodiment of the present invention, illustrating a communication environment of a mobile node thereof.

FIG. 6 is a schematic block diagram illustrating a communication environment of the mobile node of the second embodiment. In FIG. 6, the subjects same as or similar to those of FIG. 2 are denoted respectively by the same reference symbols and will not be described here any further. By comparing FIG. 6 with FIG. 2, it will be seen that the local network 41 is replaced by subnets 71a, 71b, 71c and the remote network 42c is not required. The subnet 71a and the subnet 71c are connected to each other by way of a router 54a. The subnet 71b and the subnet 71c are connected to each other by way of another router 54b. The MN 51 is connected to the subnet 71c.

The operation of the MN 51 for expanding the local network will be described below. Firstly, the MN 51 transmits a multicast message, for which the number of hops is limited, to a nearby router. As the router 54a receives the multicast message, it returns network address information on the subnets 71a, 71b to which the router 54a is connected to the MN 51 when the number of hops is found within the specified range. The router 54b returns network address information on the subnets 71b, 71c to the MN 51 in a similar manner.

The network address information returned from the routers includes an IP address and address mask information like the information provided by the DHCP server described above for the first embodiment. Upon receiving the network address information from the router, the MN 51 computationally determines the range of network addresses that can be regarded as those of the local network and registers the network addresses in the interface selection table. The operation of the MN 51 for transmitting packets and the operation thereof for receiving packets of the MN 51 are same as those of the first embodiment.

FIG. 7 is an interface selection table that can be used for the second embodiment. Unlike the interface selection table of the first embodiment, a plurality of entries (subnets 71a, 71b, 71c) are registered as those that are found within the range of network addresses that select the original interface 11.

Thus, with this embodiment, it is possible for the mobile node to expand the scope of the local network with ease by utilizing the functional features of the routers.

Third Embodiment

The mobile node of the third embodiment utilizes a plurality of local networks.

While the software configuration of the mobile node of this embodiment is same as that of the mobile node of the first embodiment, original interfaces are generated as many as the number of local networks.

Now, a typical communication environment of the mobile node of the third embodiment will be described below.

Figure 8:
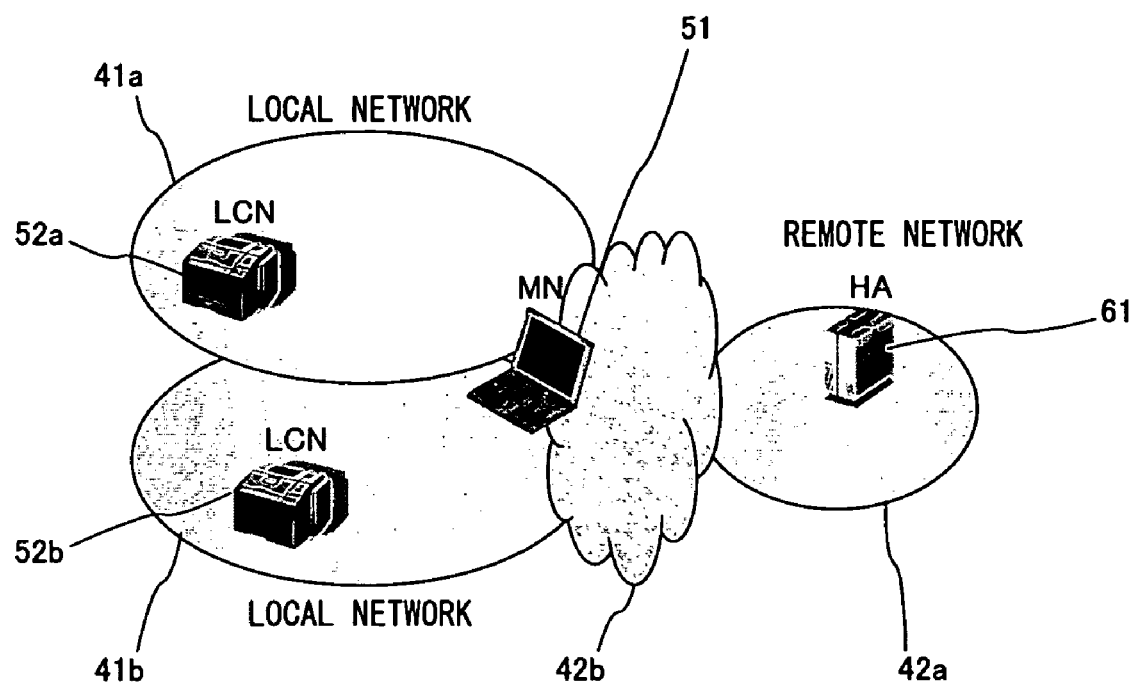
FIG. 8 is a schematic block diagram of a third embodiment of the present invention, illustrating a communication environment of a mobile node thereof.

FIG. 8 is a schematic block diagram illustrating a communication environment of the mobile node of the third embodiment. In FIG. 8, the subjects same as or similar to those of FIG. 2 are denoted respectively by the same reference symbols and will not be described here any further. By comparing FIG. 8 with FIG. 2, it will be seen that the local network 41 is replaced by local networks 41a, 41b and the remote network 42c is not required. The local network 41a is connected to LCN 52a while the local network 41b is connected to LCN 52b. The MN 51 is connected to both of the local networks 41a, 41b.

When there are a plurality of local networks, care-of addresses are assigned to the MN 51 by the respective local networks and the MN 51 generates an original interface for each of the local networks.

In the illustrated instance, care-of address A (CoAA) is assigned to the MN 51 by the local network 41a and care-of address B (CoAB) is assigned to the MN 51 by the local network 41b. At this time, the MN 51 generates original interface A to which CoAA is assigned and original interface B to which CoAB is assigned.

FIG. 9 is an interface selection table that can be used for the third embodiment. Referring to FIG. 9, entries are registered for each local network in the interface selection table. While the operation of the MN 51 for transmitting packets and the operation thereof for receiving packets of the MN 51 are same as those of the first embodiment, the MN 51 employs the original interface A, to which CoAA is assigned, when it locally communicates with the LCN 52a found on the local network 41a but it employs the original interface B to which CoAB is assigned, when it locally communicates with the LCN 52b that is found on the local network 41b.

A single network interface, which is a piece of hardware, that corresponds to the plurality of original interfaces 11, may be used in a switched manner or, alternatively, a plurality of network interfaces may be provided for the respective original interfaces 11.

Thus, with this embodiment, it is possible to selectively use local communications that are conducted on a plurality of local networks and remote communications.

Fourth Embodiment

In this embodiment, the mobile node utilizes a plurality of remote networks.

While the software configuration of the mobile node of this embodiment is same as that of the mobile node of the first embodiment, Mobile IP virtual interfaces 12 are generated as many as the number of remote networks.

Now, a typical communication environment of the mobile node of the fourth embodiment will be described below.

Figure 10:
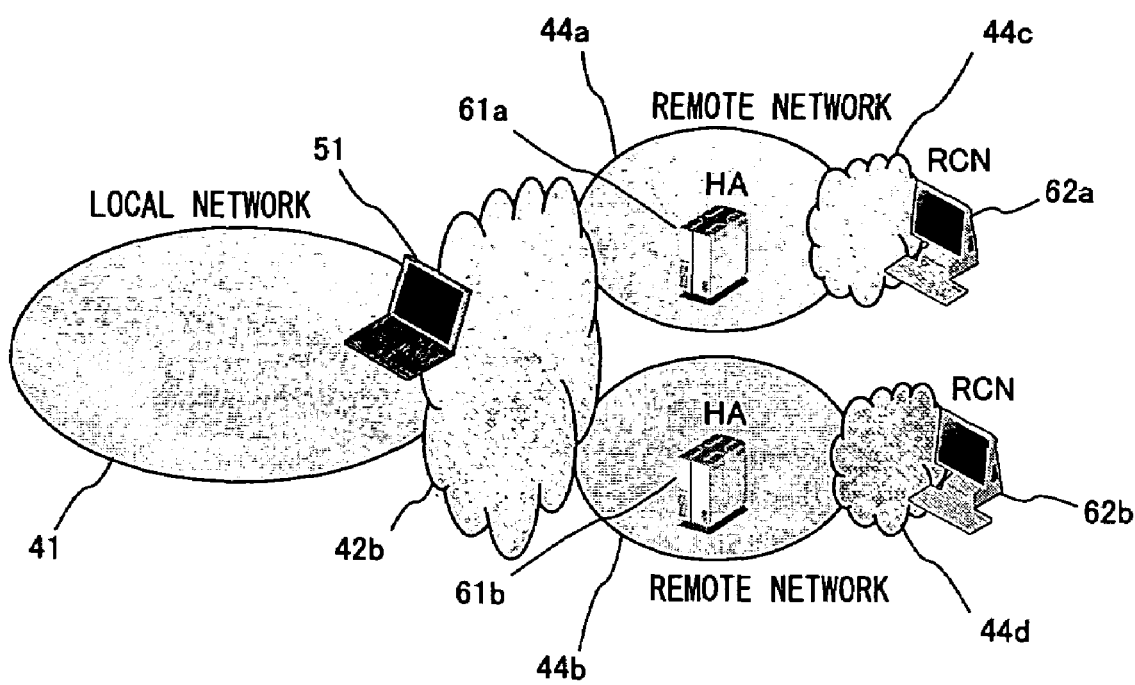
FIG. 10 is a schematic block diagram of a fourth embodiment of the present invention, illustrating a communication environment of a mobile node thereof.

FIG. 10 is a schematic block diagram illustrating a communication environment of the mobile node of the fourth embodiment. In FIG. 10, the subjects same as or similar to those of FIG. 2 are denoted respectively by the same reference symbols and will not be described here any further. By comparing FIG. 10 with FIG. 2, it will be seen that the remote networks 42a, 42c are replaced by remote networks 44a, 44b, 44c, 44d. The HA 61a is connected to the remote network 44a and the HA 61b is connected to the remote network 44b, while the RCN 62a is connected to the remote network 44c and the RCN 62b is connected to the remote network 44d.

When there exist a plurality of remote networks, a home address is assigned to the MN 51 for each remote network and the MN 51 generates a Mobile IP virtual interface 12 for each remote network.

In the illustrated instance, home address A (HoAA) is assigned to the MN 51 by the HA 61a and home address B (HoAB) is assigned to the MN 51 by the HA 61b. At this time, the MN 51 generates Mobile IP virtual interface A to which HoAA is assigned and Mobile IP virtual interface B to which HoAB is assigned.

FIG. 11 is an interface selection table that can be used for the fourth embodiment. Referring to FIG. 11, entries are registered for each remote network in the interface selection table. As shown in FIG. 11, the address of the HA 61a is HAA and that of the HA 61b is HAB. While the operation of the MN 51 for transmitting packets and the operation thereof for receiving packets of the MN 51 are same as those of the first embodiment, the MN 51 employs the Mobile IP virtual interface A, to which HoAA is assigned, when it remotely communicates with the RCN 62a found on the remote network 44c but it employs the Mobile IP virtual interface B to which HoAB is assigned, when it remotely communicates with the RCN 62b that is found on the remote network 44d.

A single original interface and a single network interface, which is a piece of hardware, that correspond to the plurality of Mobile IP virtual interfaces 12, may be used in a switched manner or, alternatively, a plurality of original interfaces and a plurality of network interfaces may be provided for the respective Mobile IP virtual interfaces 12.

Thus, with this embodiment, it is possible to selectively use remote communications that are conducted on a plurality of remote networks and local communications.

Fifth Embodiment

In this embodiment, the mobile node can automatically acquire the scope of the remote networks.

The software configuration of the mobile node of this embodiment is same as that of the mobile node of the first embodiment.

Now, a typical communication environment of the mobile node of the fifth embodiment will be described below.

Figure 12:
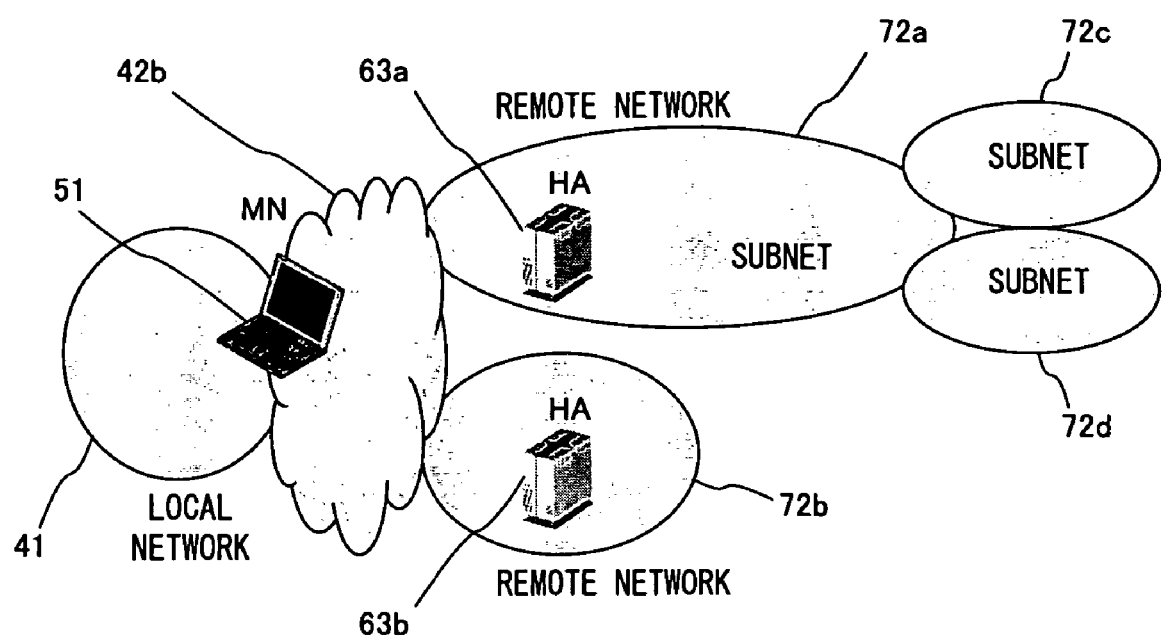
FIG. 12 is a schematic block diagram of a fifth embodiment of the present invention, illustrating a communication environment of a mobile node thereof.

FIG. 12 is a schematic block diagram illustrating a communication environment of the mobile node of the fifth embodiment. In FIG. 12, the subjects same as or similar to those of FIG. 2 are denoted respectively by the same reference symbols and will not be described here any further. By comparing FIG. 12 with FIG. 2, it will be seen that the remote networks 42a, 42b are replaced by subnets (SNs) 72a, 72b, 72c, 72d. The subnets 72c, 72d are connected to the subnet 72a. HA 63a is connected to the subnet 72a while HA 63b is connected to the subnet 72b. The address of the HA 63a is HM while that of the HA 63b is HAB.

When the MN 51 registers the corresponding relationship between the home address (HoA) and the care-of address (CoA) in the HA 63a, it issues a registration request [RFC3344]. As the HA63a receives the request and completes the registration, it notifies the MN 51 of the completion of registration by means of a registration reply [RFC3344]

The HA 63a of this embodiment expands the field of registration reply [RFC3344]. FIG. 13 is a schematic illustration of the field of registration reply [RFC3344]of the fifth embodiment. Summarized information of the subnets that the Mobile IP virtual interfaces 12 of the MN 51 use is contained in the expanded field. In the illustrated instance, the three subnets 72a, 72c, 72d are described so as to be handled as so many remote networks.

FIG. 14 is an interface selection table that can be used for the fifth embodiment. Referring to FIG. 14, the MN 51 registers the entries of the subnets 72a, 72c, 72d in the interface selection table as remote networks that the Mobile IP virtual interface 12 employs. The operation of the MN 51 for transmitting packets and the operation thereof for receiving packets of the MN 51 are same as those of the first embodiment.

Thus, with this embodiment, it is possible for the mobile node to automatically define the range of remote networks as the home agent provides the scope of remote networks.

Sixth Embodiment

In this embodiment, if the mobile node moves from a first local network where it is making a local communication to a second local network, it can continue the local communication it was making on the first local network.

The software configuration of the mobile node of this embodiment is same as that of the mobile node of the first embodiment.

Now, a typical communication environment of the mobile node of the sixth embodiment will be described below.

Figure 15:
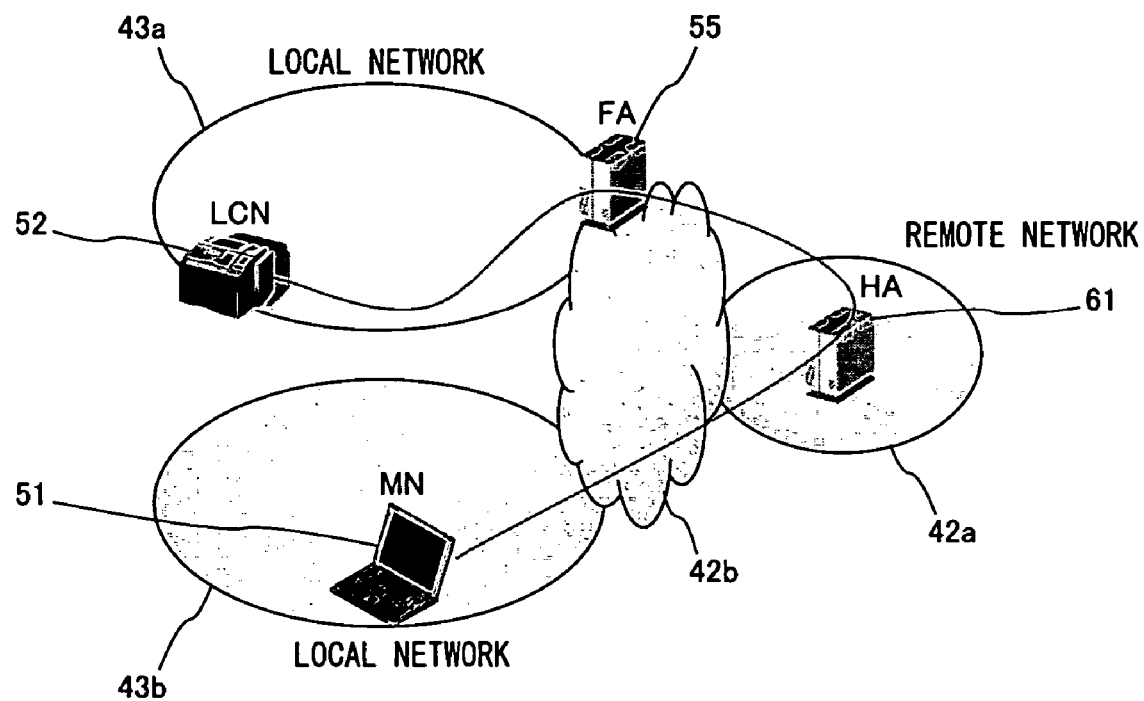
FIG. 15 is a schematic block diagram of a sixth embodiment of the present invention, illustrating a communication environment of a mobile node thereof.

FIG. 15 is a schematic block diagram illustrating a communication environment of the mobile node of the sixth embodiment. In FIG. 15, the subjects same as or similar to those of FIG. 2 are denoted respectively by the same reference symbols and will not be described here any further. By comparing FIG. 15 with FIG. 2, it will be seen that the local network 41 is replaced by an old local network 43a and a new local network 43b and the remote network 42c is not required. The LCN 52 and foreign agent (FA) 55 are connected to the old local network 43a. It is assumed here that the MN 51 moves from the old local network 43a to the new local network 43b. Note that the MN 51 has a home address (HoA).

Now, the operation of the MN 51 and that of the FA 55 will be described below.

Firstly, as the MN 51 is connected to the old local network 43a, care-of address A (CoAA) is assigned to it and the corresponding relationship between CoAA and HoA is registered in the HA 61 as the MN 51 transmits a registration request (or binding update). At this time, the FA 55 reads the information in the registration request (or the binding update) and preserves the corresponding relationship between the CoAA and the HoA. Subsequently, the MN 51 makes a local communication with the LCN 52 in the old local network 43a.

Thereafter, as the MN 51 moves from the old local network 43a to the new local network 43b, care-of address B (CoAB) is assigned to it and the corresponding relationship between coAB and the HoA is registered in the HA 61 as the MN 51 transmits a registration request (or binding update). At this time, as the FA 55 keeps on preserving the old corresponding relationship between the CoAA and the HoA, the MN 51 can continue the local communication with the LCN 52 in the old local network 43a.

Now, the address fields of the packets for the above operation will be described below.

Firstly, an instance where the MN 51 connected to the new local network 43b transmits packets to the LCN 52 connected to the old local network 43a will be described below. In this instance, the packets are transmitted by way of the routes as described below.

(R11) the MN 51 connected to the new local network 43b
(R12) the HA 61
(R13) the FA 55 connected to the old local network 43a
(R14) the LCN 52 connected to the old local network 43a On the route from R11 to R12, the MN 51 no longer regards the old local network 43a as local network so that it encapsulates the packets by means of the Mobile IP virtual interface 12 like the packets addressed to the remote networks. Thus, the address fields of the packets to be transmitted show the information as listed below.

source address at the inside of capsule=home address (HoA)
destination address at the inside of capsule=LCN 52
source address at the outside of capsule=CoAB
destination address at the outside of capsule=address of the home agent (HA)

Since the encapsulation of the Mobile IP packets is cancelled by the HA 61, the address fields of the packets on the route from R12 to R13 show the information as listed below.
source address=CoAB
destination address=LCN 52

Since CoAA of the MN 51 that was effective when the MN 51 was connected to the old local network 43a needs to be used by the MN 51 to continue the current communication on the route from R13 to R14, the FA 55 performs an address conversion for the source address. At this time, the FA 55 uses the preserved corresponding relationship between CoAA and HoA. As a result of the address conversion, the address fields of the packets come to show the information as listed below.
source address=CoAA
destination address=LCN 52

Now, an instance where the LCN 52 connected to the old local network 43a transmits packets to the MN 51 connected to the new local network 43b will be described below. In this instance, the packets are transmitted by way of the routes as described below.
(R21) the LCN 52 connected to the old local network 43a
(R22) the FA 55 connected to the old local network 43a
(R23) the HA 61
(R24) the MN 51 connected to the new local network 43b Since CoAA needs to be used on the route from R21 to R22, the address fields of the packets show the information as listed below.
source address=LCN 52
destination address=CoAA Since the FA 55 performs an address conversion, using the corresponding relationship between CoAA and HoA, the address fields of the packets on the route from R22 to R23 show the information as listed below.
source address=LCN 52
destination address=HoA Since the HA 61 encapsulates the Mobile IP, the address fields of the packets on the route from R23 to R24 show the information as listed below.
source address at the inside of capsule=LCN 52
destination address at the inside of capsule=HoA
source address at the outside of capsule=HA
destination address at the outside of capsule=CoAB Since the source address at the outside of capsule is that of the HA 61, the MN 51 that receives the packets can decapsulate by means of the Mobile IP virtual interface 12.

As described above, the FA 55 preserves the corresponding relationship between CoAA and HoA. However, the address of CoAA cannot be used forever if it keeps on preserving the corresponding relationship. Therefore, when the effective period of the corresponding relationship between CoAA and HoA is over and CoAA is assigned to some other terminal by the DHCP, the FA 55 nullifies the corresponding relationship between CoAA and HoA.

Figure 16:
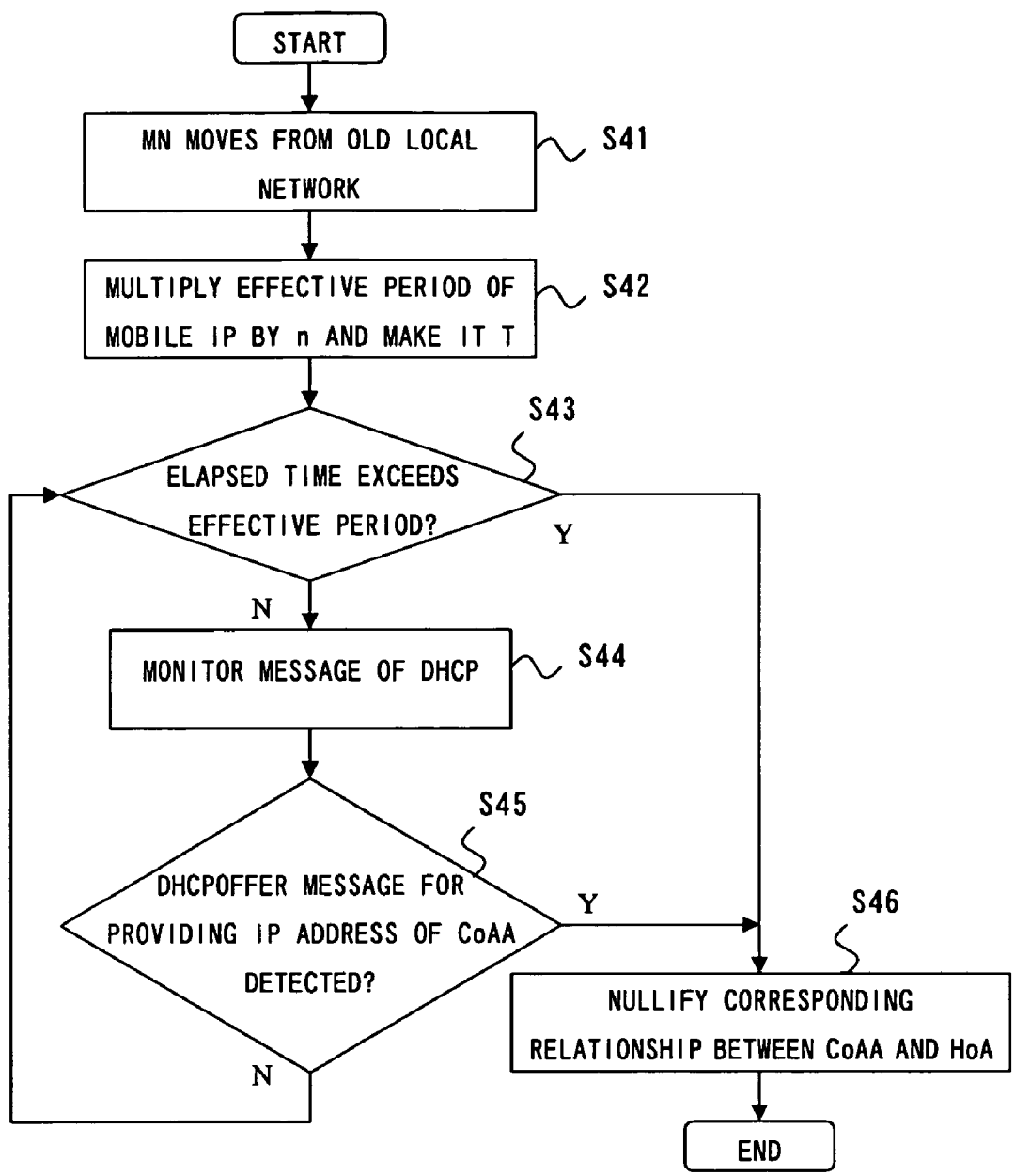
FIG. 16 is a flowchart of the operation of nullifying the corresponding relationship between CoA and HoA by FA of the sixth embodiment.

FIG. 16 is a flowchart of the operation of nullifying the corresponding relationship between CoA and HoA by FA of the sixth embodiment. Referring to FIG. 16, firstly as the MN 51 moves out from the old local network 43a (S41), the FA 55 acquires the registration request and the value of the effective period of the Mobile IP contained in the registration reply. Then, it multiplies the value of the effective period of the Mobile IP by n to use the product of multiplication as the effective period T for the corresponding relationship between CoAA and HoA (S42). Thereafter, the FA 55 determines if the time since it preserved the corresponding relationship has exceeded T or not (S43). If the time has exceeded T (S43, Y), the FA 55 nullifies the corresponding relationship between CoAA and HoA (S46) to end the flow of operation.

If, on the other hand, the time has not exceeded T yet (S43, N), the FA 55 monitors the message of the DHCP in the old local network 43a (Step S44). With the DHCP, a terminal acquires the IP address assigned to it by means of a DHCPOFFER message. Therefore, the FA 55 monitors the DHCPOFFER message and determines if an IP address same as CoAA is detected in it or not (Step S45). The FA 55 proceeds to the processing step S46 when CoAA is detected (S45, Y), whereas it proceeds to Step S43 when CoAA is not detected (S45, N).

Thus, with this embodiment, the mobile node can access the old local network in the ordinary manner if it moves from the old local network to a new local network and hence can continue the ongoing communication with some other terminal in the old local network.

Seventh Embodiment

The mobile node of this embodiment relays the communication between a terminal in one of the remote networks and a terminal in the local network. This is effective for a private network where the local network uses an NAPT feature.

The software configuration of the mobile node of this embodiment will be described below.

Figure 17:
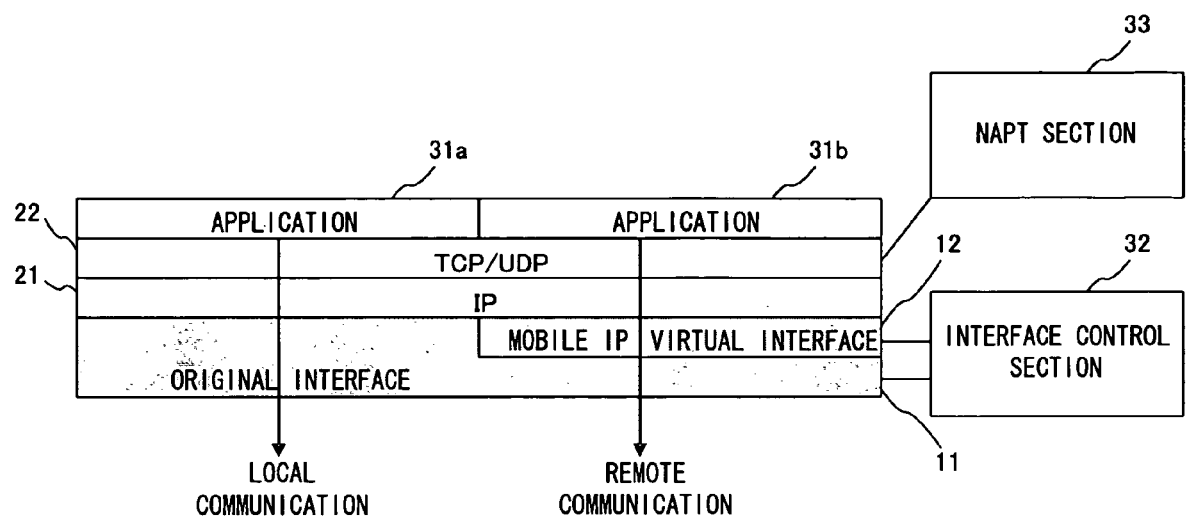
FIG. 17 is a schematic block diagram of a seventh embodiment of the present invention, illustrating the software configuration of a mobile node thereof.

FIG. 17 is a schematic block diagram of the seventh embodiment, illustrating the software configuration of a mobile node thereof. In FIG. 17, the subjects same as or similar to those of FIG. 1 are denoted respectively by the same reference symbols and will not be described here any further. By comparing FIG. 17 with FIG. 1, it will be seen that the mobile node additionally comprises an NAPT (network address & port translation) section 33.

The NAPT section 33 manages a port mapping table and performs address conversions. When an NAPT feature is used, the IP address and the port number at the side of an NAPT private network and the IP address and the port number at the side of a global network are mapped to show one-to-one correspondence on a port mapping table. Thus, it is possible for the NAPT section 33 to establish communication between a private network and a global network by converting the address fields of packets by means of a port mapping table.

Now, a typical communication environment of the mobile node of the seventh embodiment will be described below.

Figure 18:
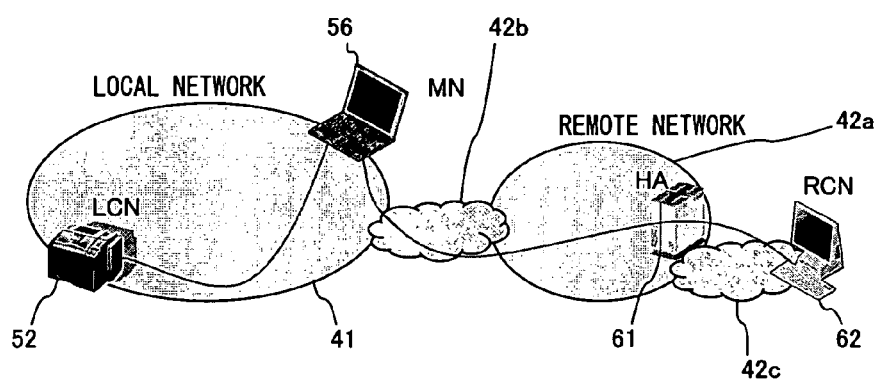
FIG. 18 is a schematic block diagram of the seventh embodiment, illustrating a communication environment of the mobile node of FIG. 17.

FIG. 18 is a schematic block diagram illustrating a communication environment of the mobile node of the seventh embodiment. In FIG. 18, the subjects same as or similar to those of FIG. 2 are denoted respectively by the same reference symbols and will not be described here any further. By comparing FIG. 18 with FIG. 2, it will be seen that the MN 51 of FIG. 2 is replaced by MN 56, which is also an information communication apparatus according to the present invention. The HA 61 has a home agent address (HA) and it is assumed that a care-of address (CoA) is assigned to the MN 56 by the local network 41.

This embodiment utilizes the UPnP (universal plug-and-play) service or an equivalent service. Additionally, it is assumed here that UPnP expresses the type of service for the service and the port number of the terminal LCN in the local network 41. Thus, the terminal RCN 62 in the remote network 42c knows the service and the port number of the LCN and the home address (HoA) of the MN 56.

Firstly, the RCN 62 enquires the MN 56 if the local network 41 can provide the service it wants or not. At this time, the RCN 62 transmits enquiry packets to the HoA of the MN 56. The enquiry packets are encapsulated by the HA 61 and get to the MN 56. Upon receiving the enquiry packets, the MN 56 cancels the encapsulation of the enquiry packets by means of the Mobile IP virtual interface 12 and acknowledges the request.

Then, the MN 56 enquires the local network 41 if there is a terminal that provides the service the RCN 62 wants or not by means of the SSDP (simple service discovery protocol). The enquiry gets to the LCN 52 by multicast if the MN 56 does not know the IP address of the LCN 52 that provides the UPnP service. Therefore, if the local network 41 provides the service the RCN 62 wants, the LCN 52 sends back the own address (LCN-ADDR) to the MN 56. Upon receiving LCN-ADDR, the terminal MN 56 delivers the address to the RCN 62.

Thus, the terminal RCN 62 that received LCN-ADDR comes to know LCN-ADDR and the port number (LCN-PORT) found in the local network 41. Then, the RCN 62 specifies HoA of the MN 56 and an arbitrarily selected port number (ANY-PORT) and asks the MN 56 to rewrite the port mapping table.

FIG. 19 is a port mapping table of the seventh embodiment. As the NAPT section 33 executes an address conversion process, using the port mapping table, the local network side gets LCN-ADDR and LCN-PORT while remote network side gets HoA and ANY-PORT.

Therefore, the RCN 62 can receive the desired service by transmitted packets directed to HoA and the arbitrarily selected port number to the MN 56, which are delivered to the LCN 52. At this time, the packets are transferred by way of the route as shown below.
(R31) RCN 62
(R32) HA 61
(R33) MN 56
(R34) LCN 52

Firstly, the address fields of the packets on the route from R31 to R32 show the information as listed below.
source address=IP address of RCN 62 (RCN-ADDR)
source port=port number of RCN 62 (RCN-PORT)
destination address=HoA
destination port=ANY-PORT Since the packets that arrive at HA 61 are encapsulated, the address fields of the packets on the route from R32 to R33 show the information as listed below.
source address at the inside of capsule=RCN-ADDR
source port at the inside of capsule=RCN-PORT
destination address at the inside of capsule=HoA
destination port at the inside of capsule 32 ANY-PORT
source address at the outside of capsule=HA
destination address at the outside of capsule=CoA The packets that arrive at the MN 56 are cancelled for the encapsulation by the Mobile IP virtual interface 12 and the IP address and the port number thereof are rewritten by the NAPT section 33. Then, the packets are transmitted to the LCN 52 in the local network 41 by the original interface 11. Thus, the address fields of the packets on the route from R33 to R34 show the information as listed below.
source address=RCN-ADDR
source port=RCN-PORT
destination address=LCN-ADDR
destination port=LCN-PORT Thus, the packets get to the LCN 52. In the opposite direction, the IP address and the port number of the packets from the LCN 52 are rewritten by the NAPT section 33 of the MN 56 and the packets are encapsulated by the Mobile IP virtual interface 12 in a similar manner before they gets to the RCN 62.

Since the mobile node of embodiment has an NAPT feature, it is possible for a terminal in a local network and a terminal in a remote network to communicate with each other if not equipped with the Mobile IP.

An information communication apparatus according to the invention can be applied to an information communication system with ease to enhance the performance of the information communication system. Such an information communication system may be a LAN (local area network), a public wireless LAN, a mobile communication system, an inter-train vehicle communication system, an inter-automobile communication system or some other system.

Additionally, the present invention provides an information communication program for causing the computer of an information communication apparatus to execute the above-described steps. Such a computer program can be executed by the computer of an information communication apparatus when it is stored in a computer-readable recording medium. Computer-readable recording mediums that can be used for the purpose of the present invention include ROMs and RAMs that are mounted in the inside of computers, portable type recording mediums such as CD-ROMs, flexible disks, DVD disks, magneto-optical disks and IC cards, data bases for holding computer programs, external computers and their data bases and transmission mediums on lines.

The receiving party's address determining step and the transmitting party's address determining step correspond to the interface control section of any of the above-described embodiments. The encapsulating step and the encapsulation canceling step correspond to the Mobile IP virtual interface of any of the above-described embodiments. The transmitting step and the receiving step correspond to the processing operation of the original interface of any of the above-described embodiments. The first relay apparatus corresponds to the home agent of any of the above-described embodiments. The second relay apparatus corresponds to the foreign agent of any of the above-described embodiments.

The receiving party's address determining section and the transmitting party's address determining section correspond to the interface control section of any of the above-described embodiments. The encapsulating section and the encapsulation canceling section correspond to the Mobile IP virtual interface of any of the above-described embodiments. The transmitting section and the receiving section correspond to the processing operation of the original interface of any of the above-described embodiments.

What is claimed is:

1. A comouter readable medium recording thereon an information communication program for causing a computer to execute an operation of controlling an information communication apparatus having a static address in advance assigned thereto and registered in an external first relay apparatus and a dynamic address assigned thereto on a subnet connected thereto, the program to execute a process comprising:

determining the address of a party receiving packets generated by an application of the information communication apparatus according to address information of the packets to be transmitted and address information of a predetermined first subnet in order to transmit the packets to the receiving party; and encapsulating the packets to be transmitted so as to transmit the packets by way of the first relay apparatus when the receiving party's address is the first subnet;

wherein the program is to be executed by the computer reading the computer readable medium.

2. The computer readable medium according to claim 1, wherein the process further comprising:
  determining the address of a party that is to transmit the packets when the packets to be received arrive from a network according to address information of the packets to be received and address information of the first relay apparatus acquired in advance; and
  canceling the encapsulation of the packets to be received that are encapsulated by the first relay apparatus when the address of the transmitting party is determined to be that of the first relay apparatus by the determining the address of the transmitted party.

3. The computer readable medium according to claim 2, wherein,
  determining the address of the transmitted party comprises:
    determining the address of the transmitted party according to address information of the packets to be received, address information of the first relay apparatus acquired in advance and address information of a predetermined second subnet acquired in advance and the process further comprising:
    upon the encapsulation of the packets to be received is cancelled by the encapsulation canceling step, delivering the packets to be received, for which the encapsulation is canceled, to the application of the information communication apparatus.

4. The computer readable medium according to claim 3, wherein the process further comprising:
  upon the transmitted party's address is determined to be the second subnet by the determining the address of the transmitted party, delivering the packets to be received alone to the application of the information communication apparatus.

5. The computer readable medium according to claim 4, wherein the process further comprising:
  upon the transmitted party's address is determined to be neither the address of the first relay apparatus nor that of the second subnet by the determining the address of the transmitted party, processing the packets to be received as unauthorized packets.

6. The computer readable medium according to claim 2, wherein
  different static addresses are assigned to the information communication apparatus in advance from the plurality of first relay apparatus, and
  determining the transmitting party's address includes acquiring address information of the plurality of first relay apparatus, and
  encapsulating the packets includes encapsulating the packets so as to transmit the packets by each of the static addresses.

7. The computer readable medium according to claim 1, wherein,
  determining the address of the receiving party comprises:
    determining the address of the receiving party according to address information of the packets to be transmitted, address information of the first subnet acquired in advance and address information of a predetermined second subnet that is acquired in advance; and
  the process further comprising:
    transmitting the encapsulated packets once the packets to be transmitted are encapsulated by the encapsulating the packets to be transmitted, and
    transmitting the packets to be transmitted without encapsulation once the transmitting party's address is determined to be the second subnet by the determining the address of the transmitting party.

8. The computer readable medium according to claim 1, wherein the process further comprising:
  computationally determining the range of addresses of a subnet according to the dynamic address and the address mask that are assigned when the information communication apparatus is connected to the subnet; and
  providing the range of addresses as address information of the second subnet.

9. The computer readable medium according to claim 1, wherein the process further comprising:
  transmitting a multicast message, for which the number of hops is limited, to the network,
  receiving a response message responding to the multicast message,
  acquiring subnet information from the response message, and
  providing the subnet information as address information of the second subnet.

10. The computer readable medium according to claim 1, wherein,
  the information communication apparatus is connected to a plurality of subnets and a dynamic address is assigned to it from each of the plurality of subnets, and
  determining the receiving party's address includes acquiring address information of the plurality of subnets as address information of the second subnet, and
  the packets are transmitted to each of the dynamic addresses.

11. The computer readable medium according to claim 1, wherein the process further comprising:
  transmitting a registration request message for assignment of a static address to the first relay apparatus,
  receiving a response message responding to the registration request message from the first relay apparatus and acquires address information on the address of the first relay apparatus, the static address and the address of the first subnet; and
  wherein the first relay apparatus being adapted to transmit a response message including information on the address of the first relay apparatus, the static address and the address of the first subnet in response to the registration request message transmitted from the information communication apparatus.

12. The computer readable medium according to claim 1, wherein the process further comprising:
  transmitting the corresponding relationship between the static address and the first dynamic address assigned by a first connection subnet to the first relay apparatus once the information communication apparatus is connected to the first connection subnet that is a subnet; and
  transmitting the corresponding relationship between the static address and the second dynamic address assigned by a second connection subnet to the first relay apparatus once the information communication apparatus is connected to the second connection subnet that is a subnet different from the first connection subnet,
  wherein a second relay apparatus, which is a relay apparatus existing in the first connection subnet, being adapted to acquire the corresponding relationship between the static address and the first dynamic address transmitted by the corresponding relationship registering step and, when communication is conducted between the information communication apparatus connected to the second connection subnet and a terminal connected to the first connection subnet by way of the first relay apparatus, execute an address conversion of the static address and the first dynamic address between the first relay apparatus and a terminal connected to the first connection subnet.

13. The computer readable medium according to claim 12, wherein
the second relay apparatus to manage an effective period of the corresponding relationship; between the static address and the first dynamic address.

14. The computer readable medium according to claim 1, wherein the process further comprising:
executing an address conversion between the first terminal connected to the first subnet and a second terminal connected to the second subnet.

15. The computer readable medium according to claim 14, wherein
the receiving party's address of the packets is the static address of the information communication apparatus and the address converting step converts the address of the party receiving the packets to the address of the second terminal once the first terminal transmits the packets to the second terminal.

16. The computer readable medium according to claim 14, wherein
the receiving party's address of the packets is the dynamic address of the information communication apparatus, and
executing the address conversion includes converting the address of the party receiving the packets to the address of the first terminal when the second terminal transmits the packets to the first terminal.

17. The computer readable medium according to claim 1, wherein
the information communication apparatus is a mobile node for a Mobile IP, and
the first relay apparatus is a home agent for the Mobile IP, whereas
the static address is a home address for the Mobile IP, and
the dynamic address is a care-of address for the Mobile IP.

18. An information communication apparatus having a static address in advance assigned thereto and registered in an external first relay apparatus and a dynamic address assigned thereto on a subnet connected thereto, the apparatus comprising:
an application execution section to execute an application for generating packets;
a receiving party's address determining section to determine the address of a party receiving the packets generated by the application execution section according to address information of the packets to be transmitted and address information of a predetermined first subnet in order to transmit the packets to the receiving party; and
an encapsulating section to encapsulate the packets to be transmitted so as to transmit the packets by way of the first relay apparatus when the receiving party's address is the first subnet.

19. The apparatus according to claim 18, further comprising:
a transmitting party's address determining section to determine the address of a party that transmitted the packets when the packets to be received arrive from a network according to address information of the packets to be received and address information of the first relay apparatus acquired in advance; and
an encapsulation canceling section to cancel the encapsulation of the packets to be received that are encapsulated by the first relay apparatus when the address of the transmitting party is determined to be that of the first relay apparatus by the transmitting party's address determining section.

20. The apparatus according to claim 19, wherein
the transmitting party's address determining section to determine the address of the party transmitting the packets to be received according to address information of the packets to be received, address information of the first relay apparatus acquired in advance and address information of a predetermined second subnet acquired in advance.

21. The apparatus according to claim 20, wherein the apparatus further comprising:
a receiving section that, once the encapsulation of the packets to be received is cancelled by the encapsulation canceling section, is to output the packets to be received for which the encapsulation is canceled.

22. The apparatus according to claim 20, wherein the apparatus further comprising:
a receiving section that, once the transmitting party's address is determined to be the second subnet by the transmitting party's address determining section, is to output the packets to be received alone.

23. The apparatus according to claim 20, wherein the apparatus further comprising:
a receiving section that, once the transmitting party's address determining section determines that the transmitting party's address is neither the address of the first relay apparatus nor that of the second subnet, is to process the packets to be received as unauthorized packets.

24. The apparatus according to claim 18, wherein
the receiving party's address determining section to determine the address of the party receiving the packets to be transmitted according to address information of the packets to be transmitted, address information of the first subnet acquired in advance and address information of a predetermined second subnet that is acquired in advance and, further comprising
a transmitting section to transmit the encapsulated packets once the packets to be transmitted are encapsulated by the encapsulating section and to transmit the packets to be transmitted without encapsulation once the transmitting party's address is determined to be the second subnet by the transmitting party's address determining section.

25. An information communication method for controlling an information communication apparatus having a static address in advance assigned thereto and registered in an external first relay apparatus and a dynamic address assigned thereto on a subnet connected thereto, the method comprising:
determining the address of a party receiving packets generated by an application of the information communication apparatus according to address information of the packets to be transmitted and address information of a predetermined first subnet in order to transmit the packets to the receiving party; and
encapsulating the packets to be transmitted so as to transmit the packets by way of the first relay apparatus when the receiving party's address is the first subnet.

26. The method according to claim 25, further comprising:

determining the address of a party that transmitted the packets when the packets to be received arrive from a network according to address information of the packets to be received and address information of the first relay apparatus acquired in advance; and canceling the encapsulation of the packets to be received that are encapsulated by the first relay apparatus once the address of the transmitting party is determined to be that of the first relay apparatus by the transmitting party's address determining step.

* * * * *